Patented Apr. 30, 1935

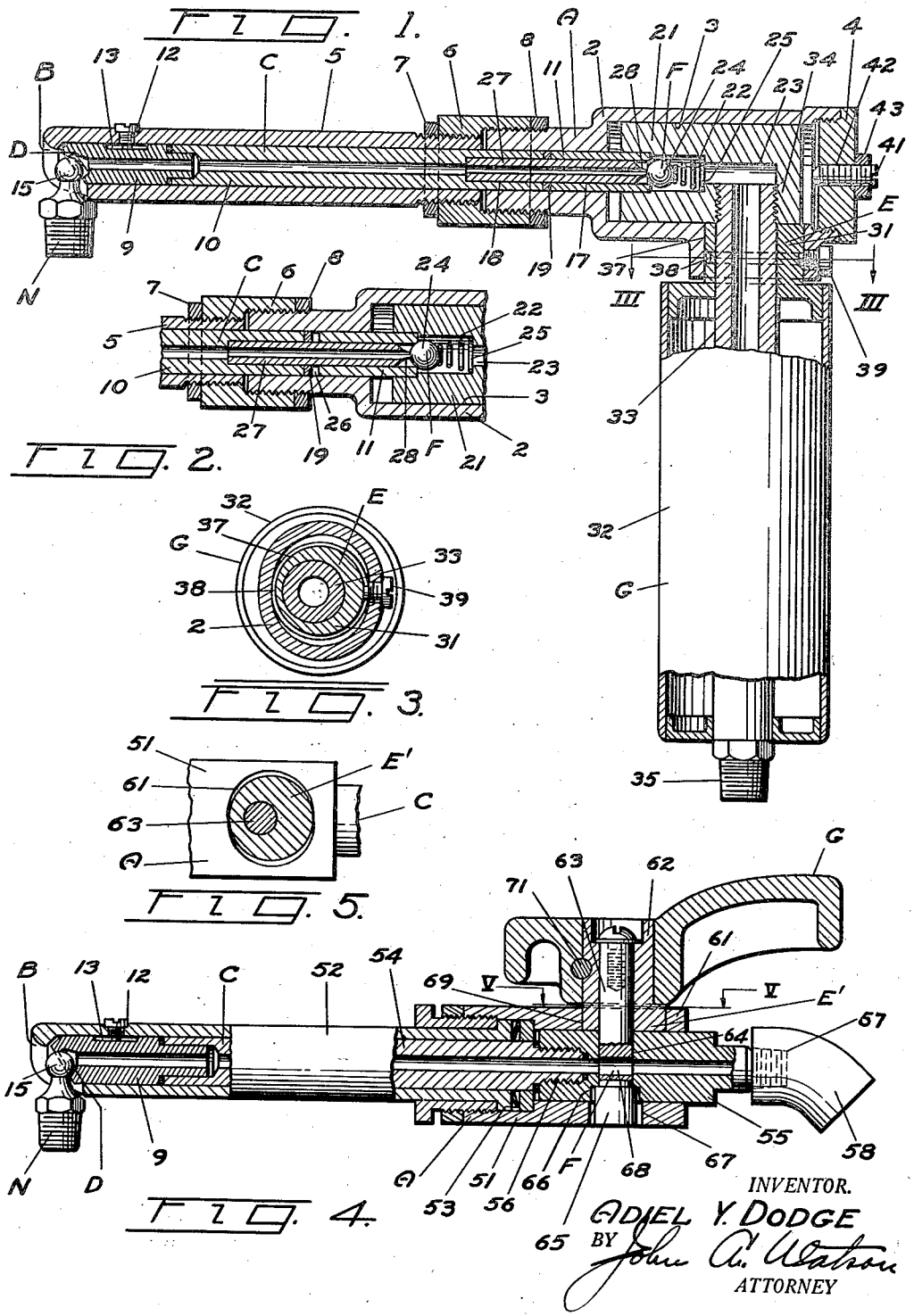

1,999,447

UNITED STATES PATENT OFFICE 1,999,447

LUBRICATING DEVICE

Adiel Y. Dodge, South Bend, Ind., assignor to The Lubrication Corporation, South Bend, Ind., a corporation of Delaware Application April 1, 1932, Serial No. 602,420

10 Claims. (Cl. 284—17)

This invention relates to improvements in lubricant discharge nozzles and more particularly nozzles of the type incorporating means for clamping the discharge orifice of the nozzle in engagement tightly with a lubrication nipple or fitting associated with the bearing or parts to be lubricated.

An object of the invention is to provide a lubricant discharge nozzle of the clamp type wherein the clamping mechanism is operated by the rotation of a cam about an axis transverse to the longitudinal axis of the nozzle.

Another object is to provide a clamp type lubricant discharge nozzle incorporating valve means for automatically shutting off the flow of lubricant through the nozzle when the nozzle is disengaged from the fitting.

Another object is to provide a lubricant discharge nozzle of the clamp type in which the mechanism for moving the clamping elements is irreversible through stresses imposed thereon as by the pressure of lubricant fed through the nozzle tending to push the nozzle away from the fitting.

Another object is to provide a lubricant discharge nozzle having adjustment means to obtain full clamping and unclamping function with minimum movement of the clamp actuating member.

Other objects, the advantages, and uses of the invention, will be, or should become apparent after reading the following description and claims and after consideration of the accompanying drawing forming a part of this specification, in which:

Fig. 1 is a sectional view of a clamp type lubricant discharge nozzle constructed in accordance with my invention;

Fig. 2 is a fragmentary view of parts illustrated in Fig. 1, showing the lubricant control valve closed;

Fig. 3 is a sectional view as along the line III—III of Fig. 1;

Fig. 4 is a sectional view of another form of the discharge nozzle; and

Fig. 5 is a sectional view as along the line V—V of Fig. 4.

In general the lubricant discharge nozzles selected for illustration herein comprise an elongated body A, including a forwardly extending tubular member terminating in an integral lubricant nipple engaging clamp element B, a lubricant conduit C within the body A having a discharge orifice D in registration with the clamp element B, cam mechanism E for causing relative movement between the conduit C and the clamp element B, a valve F operable upon actuation of the cam mechanism E to control the flow of lubricant through the nozzle, and a manually engageable member G for operating the cam mechanism E.

The discharge nozzle illustrated in Figs. 1 to 3 is characterized by the construction of the manually engageable cam operating member G in the form of a pistol hand grip by means of which the nozzle may be supported and operated in use. In this nozzle the body A comprises a member 2 having an enlarged bore 3 in its rearward end closed by a screw threaded plug 4 and the tubular member 5 including the clamping element B secured to the member 2 by an adjustable screw threaded bushing 6 having lock nuts 7 and 8 associated therewith whereby the members 2 and 5 of the body A may be moved toward or away from each other during initial adjustment of the nozzle and to correct error in the relationship of the body A and the conduit C as through wear from usage.

The conduit C is preferably constructed of three parts 9, 10 and 11 having aligned bores therethrough. The part 9 incorporating the discharge orifice D may, if desired, be formed integral with the part 10. It has been shown as a separate part, however, since such an arrangement more readily lends itself to heat treatment of the part 9 as in hardening the metal adjacent the discharge orifice for wear resisting purposes. A stud screw 12 extends through the wall of the member 5 and into a groove 13 formed on the outer wall of the part 9 to prevent rotation of the discharge orifice D relative to the clamping element B.

The clamping element B and the cooperating portion of the conduit C with its discharge orifice D is of the general type illustrated and described in the United States patent to Herlihy Re. 18,288 and is intended for use with a lubrication nipple or fitting N having a spherical head 15. The discharge orifice D communicates with the bore of the conduit C and is formed to partially receive the head 15 of the fitting and to establish an annular contact therebetween to provide a lubricant tight seal maintained against relatively high lubricant pressure by the function of the clamping mechanism in the manner hereinafter described.

The internal diameter of the conduit part 11 is larger than that of the part 9 and the major portion of the part 10, as indicated at 17, as is also the adjacent portion of the rearward end of the part 10, as indicated at 18. An annular packing washer 19 is loosely disposed between the adjacent ends of the parts 10 and 11 of the conduit so as to provide a lubricant tight seal therebetween when the parts are compressed against one another. A metal block 21 is slidably disposed within the bore 3 of the body A and formed with an enlarged bore 22 within which the adjacent end of the part 11 is partially received and fixed. The bore 22 communicates with an aligned bore 23 of lesser diameter. A steel ball 24 forming the valve F is disposed within the bore 22 and held yieldingly against the adjacent mouth of the bore 17 of the part 11 by a compression spring 25 one end of which bears against the ball 24 and the other end against the shoulder formed by the juncture of the bores 22 and 23.

In Fig. 2 I have shown the ball 24 as seated upon the conduit as described, which condition is only permissible upon relative movement of the parts 10 and 11 of the conduit away from one another, thus leaving a slight gap 26 in that space occupied by the washer 19. This is due to the presence of a tubular valve operating member 27 disposed within the bores 17 and 18 of the parts 11 and 10 of the conduit one end of which is tapered off, as shown at 28, to contact with the ball 24 to move the ball away from its seat against the action of the spring 25 when the parts 10 and 11 are compressed against one another, as shown in Fig. 1, such as by forward thrust applied to the block 21 while the head of the fitting N is engaged with the discharge orifice and the clamping element B.

Means for moving the block 21 forwardly to provide relative thrust between the body A and the conduit C to clamp the fitting to the nozzle and compress the parts 10 and 11 against one another to open the valve comprises the cam mechanism E. The mechanism E includes a cylindrical cam member 31 disposed eccentrically upon the upper end of a cylinder 32 forming the cam actuating member or pistol grip G. The cylinder 32 with the eccentrically disposed cam 31 is rotatably mounted upon a tubular member 33 which is secured by threaded engagement, as shown at 34, to the block 21 and is in communication with the bore 23. The lower end of the member 33 has an externally threaded connector stud 35 by means of which the nozzle may be connected with a lubricant conducting hose forming a part of the lubricant pump or dispenser assembly. The cam member 31 extends within a relatively long bore 37 through the side wall of the member 2 and has an annular groove 38 formed on its side wall within which the inner end of a stud screw 39 fixed to the member 2 extends to permit rotation of the cam member with the manually engageable hand grip G but to prevent longitudinal movement of the cam and cylinder along the tubular member 33.

An adjusting screw 41 is disposed in an internally threaded bore 42 centrally located through the plug 4 so as to provide an adjustable stop for the block 21 as during rearward movement. A lock nut 43 is provided to lock the screw 41 in place when adjusted. As stated in the foregoing, the discharge nozzle, illustrated in Figs. 1 to 3 of the drawing, is intended for support in one hand of the operator by manual engagement with the pistol hand grip G. Lubricant under pressure may be conducted to the nozzle from a lubricant pump or dispenser through a suitable hose connected with the stud 35 of the tubular member 33. When the nozzle is in its unclamped position, as when out of engagement with a lubricant nipple or fitting, the valve F will assume the position shown in Fig. 2 to shut off the flow of lubricant through the conduit C. At this time both the pressure of the lubricant applied to the ball 24 and the thrust of the spring 25 may act upon the tubular member 27 to force the parts 9 and 10 of the conduit C away from the part 11 and its supporting block 21 thus permitting the ball to seat tightly upon the adjacent mouth of the part 11 of the conduit.

In applying the nozzle to the lubricant nipple or fitting N for servicing the operator should first ascertain that the parts are in the position shown in Fig. 2, which position may be assumed only through rotation of the hand grip G and cam 31 away from the position shown in Fig. 1 to draw the block 21 rearwardly. The discharge orifice D of the conduit C may then be brought to bear upon the head 15 of the fitting by a lateral movement of the nozzle over the fitting head. The clamping of the nozzle upon the fitting is thereupon brought about by the simple operation of rotating the hand grip or cam operating member G to cause the tubular member 33 together with the block 21 to move forwardly toward or to the position shown in Fig. 1. This movement of the block 21 within the body A causes a relative movement between the conduit C with its discharge orifice D and the clamping element B to clamp the orifice D in engagement tightly with the head 15 of the fitting and to compress the parts 10 and 11 of the conduit toward one another. As the adjacent ends of the parts 10 and 11 are compressed against the washer 19 the tubular valve operating member 18 bearing against the ball 24 opposes forward movement of the ball with the block 21 to cause the ball to become unseated from the adjacent end of the bore 17 of the part 11 and lubricant under pressure may flow through the valve F, the aligned bores of the conduit C and into the lubricant fitting to service the bearing or other parts with which the member is associated.

The removal of the nozzle from the fitting N may be brought about by rotating the hand grip G in the opposite direction to reverse the clamping function and simultaneously to close the valve F.

Should wear occur at the discharge orifice D or upon the adjacent surfaces of the clamping element B the relationship between the conduit C and the clamping element may be quickly adjusted by means of the adjustment bushing 6. This bushing 6 may also serve a further function of permitting the rotation of the member 5 of the body A with its clamping element B to any particular position which may be convenient to the operator other than that position shown in Fig. 1 and the parts again locked against accidental disarrangement by the lock nuts 7 and 8.

In Figs. 4 and 5 I have shown another form of my improved lubricant discharge nozzle wherein lubricant is admitted to the nozzle through a hose which may be connected directly to the rearward end of the nozzle conduit C. In this form of the nozzle the body A comprises a cylindrical member 51 and an elongated tubular member 52 corresponding to the member 5 including at its forward end an integral clamping element B. The member 52 is permitted to rotate relative to the member 51 and a friction spider 53 is interposed between the adjacent and abutting end portions of the members so that the member 52, when rotated to the position desired, may maintain that position until it is again manually changed. The conduit C comprises a part 9 including the discharge orifice D held against rotative movement with respect to the clamping element B by the stud screw 12 and slot 13 as heretofore described. The balance of the conduit C includes a tubular member 54 connected with the part 9 and with a member 55 of enlarged external diameter by threaded engagement, as shown at 56. The member 55 is disposed within the member 51 of the body A and is provided with an externally threaded portion 57 at its rearward end for connection with a lubricant discharge hose either by direct connection or through a coupling member such as an elbow 58.

Means for causing relative movement between the conduit C and the body A including the clamping element B is provided for in the cam mechanism E'. The mechanism E' comprises a cam member 61 formed on a bushing 62 fixed to the upper end of a valve cylinder 63. The valve cylinder 63 extends through a bore 64 disposed transversely through the member 55 and provided with an enlarged cylindrical head portion 65 at its lower end disposed within a recess 66 formed in the lower and outer wall of the member 55 and within an aligned bore 67 formed on the adjacent side wall of the member 51. A passage 68 is provided transversely through the valve cylinder 63 so that when the parts are in the position shown in Fig. 4 lubricant may pass through the valve F from the rearward end of the conduit C to the discharge orifice D and into the fitting N. The surface of the cam member 61 is disposed eccentrically of the axis of the valve cylinder 63 and is engaged with the cylindrical walls 69 of an opening provided through the upper side wall of the member 51. A manually engageable handle G is fixed to the bushing 62 as by a lock pin 71 so that when the handle G is rotated the valve cylinder 63 and bushing 62 will turn to cause relative movement between the members A and C and hence the clamping member B and the discharge orifice D of the nozzle and at the same time operate the valve F.

When the handle or member G is rotated so as to cause the clamping element and the discharge orifice D to move toward one another the passage 68 in the valve cylinder 63 will become aligned with the adjacent bores of the conduit C to permit the flow of lubricant therethrough and when the member G is turned to cause relative movement of the element 13 and discharge orifice D away from one another the passage 68 in the valve cylinder will be turned out of registration with the bores of the conduit C and hence shut off the flow of lubricant through the conduit.

In this form of nozzle, as in the case of that form previously described, the application of the nozzle and the operation of its clamping mechanism as during the servicing operation may be accomplished by the operator by the use of one hand thus leaving the other hand free for such other duties as may be required. If the fitting N to be lubricated is so disposed as to be more conveniently approached by an upward and lateral movement of the nozzle the member 52 including the clamping element B may be rotated relative to the body A and the part 9 of the conduit C caused to rotate therewith. This is made possible by the friction element 53 between the parts 51 and 52 and the friction unit between the parts 9 and 54 of the conduit C.

The bore 67 in the member 51 may be of such dimension as to serve as a stop to limit the relative movement between the body A and the conduit C so as to eliminate lost motion in clamping and unclamping the nozzle to and from the fitting.

It is to be understood that the embodiments of the invention herein set forth are presented for the purpose of illustration only, and various changes may be made without departing from the spirit of the invention and the scope of the claims.

I claim:

1. In a lubricant discharge nozzle of the clamp type, a lubricant conduit having a discharge orifice adapted partially to receive one side of the spherical head of a lubricant nipple, a clamping member adapted to engage with the remote side of said spherical head, and means for causing relative movement between said clamping member and said conduit with said discharge orifice including a cam rotatable about an axis perpendicular to the axis of the conduit, said clamping member and said discharge orifice being formed so as to permit the nozzle when clamped upon the head of said nipple to be rotated about the center of said head through an arc of substantially 90° away from the axis of the nipple.

2. A clamp type lubricant discharge nozzle comprising an elongated body member formed at its outer end with a lubricant nipple-engaging clamp member, a lubricant conduit slidably disposed within said body member and having a discharge orifice, the walls of which are adapted to engage with the head of a lubricant nipple to feed lubricant thereto, a tubular lubricant conducting member fixed to and extending laterally from said conduit and communicating therewith, and means for causing relative movement between said clamping member and said conduit having said discharge orifice including a cam member eccentrically mounted for rotation on said lubricant conducting member and engaging said elongated body member whereby rotation of the cam may cause relative longitudinal movement between said body with its clamp member and said conduit.

3. A clamp type lubricant discharge nozzle, comprising an elongated body member formed at its outer end with a lubricant nipple engaging clamp member, a lubricant conduit slidably disposed within said body member and having a discharge orifice, the walls of which are adapted to engage with the head of a lubricant nipple to feed lubricant thereto, a member fixed to and extending laterally from said conduit and means for causing relative movement between said clamping member and said conduit having said discharge orifice including a cam member mounted for rotation on said fixed member and engaging said body member whereby rotation of the cam may cause relative longitudinal movement between said body with its clamp member and said conduit and a normally closed valve adapted to be opened for passage of lubricant by relative movement between the body member and the conduit resulting from operation of the cam.

4. In a lubricant discharge nozzle, a clamping member, a conduit including a pair of aligned parts having axially aligned bores of substantially the same size and mounted for relative movement toward and away from one another, a tube disposed within the bores of said parts and fixed to one of the parts and projecting through the other part, and a spring pressed valve member associated with said other of said conduit parts and adapted to bear against the remote end thereof and to be displaced from said remote end by said tube when said parts are moved toward one another.

5. In a lubricant discharge nozzle, a conduit including a pair of aligned members having axially aligned bores of substantially the same size and relatively movable toward and from one another, a tube disposed within said members and fixed to one of said members and projecting through the other of said members, a spring pressed valve member associated with said other of said conduit members and adapted to bear against the remote end of said other conduit member when said members are moved away from one another, and to be displaced from the end of said conduit member by said tube when said members are moved toward one another, said valve member normally engaging said tube longitudinally to separate said conduit members, and packing means surrounding said tube between the adjacent ends of said conduit members.

6. A clamp type lubricant discharge nozzle comprising a conduit having a discharge orifice, a clamp member adapted to engage with the head of the lubricant nipple, force multiplying mechanism for causing relative movement between the conduit and the clamping member to clamp the discharge orifice of the conduit in operative engagement upon the head of said fitting, said means including a tubular lubricant conducting member extending laterally from said conduit and communicating therewith, and a cam member eccentrically mounted upon said tubular member having its cam surface associated with said clamping member whereby the rotation of said cam may cause relative movement between the clamping member and the conduit to clamp and unclamp the nozzle to and from the head of the fitting, and a valve mechanism for automatically shutting off the flow of lubricant through the nozzle when the parts are in that position required for disengagement of the nozzle from the fitting, said valve mechanism including two tubular members forming a part of said conduit adapted for longitudinal movement toward and away from one another, a spring pressed ball valve normally adapted to close the mouth of one of said members, and means associated with both of said members for causing the valve to become unseated when the members are compressed toward one another as during the operation of said cam to cause relative movement between the clamping member and the conduit.

7. In a lubricant discharge nozzle of the clamp type, a conduit having a discharge orifice, a clamping member mounted for movement along and about the axis of said conduit for engagement with the head of the lubricant nipple, and cam mechanism including a member mounted on said conduit and rotatable about an axis transverse to the axis of said conduit and engaging said clamping member for causing relative axial movement between the conduit and the clamping member, said rotatable member forming a valve for preventing the flow of lubricant through the conduit when in one position and providing for the flow of lubricant therethrough when rotated to another position.

8. A lubricant discharge nozzle comprising a conduit having one end formed with a discharge orifice adapted to partially receive the head of a lubricant receiving fitting, an elongated tubular member slidably mounted upon said conduit and provided with a fitting engaging clamping jaw in cooperative relation with said discharge orifice whereby to clamp the conduit upon the head of said fitting upon relative right line movement between the conduit and the tubular member, said tubular member being further formed with a portion of increased internal diameter at its rearward end, a body having a bore therethrough slidably mounted in said diametrically enlarged portion of the tubular member having one end of its bore communicating with said conduit and the opposite end with a source of lubricant supply, a hand grip rotatably mounted about an axis fixed with respect to said body, and an eccentric cam fixed to said hand grip and having its cam surface in constant engagement with said tubular member whereby rotation of the hand grip in one direction may cause relative right line movement between the conduit and the tubular clamping member.

9. A clamp type lubricant discharge nozzle comprising a conduit having a discharge orifice, a clamp member adapted to engage with a lubricant nipple, means for causing relative movement between said clamp member and said conduit to clamp said conduit in operative engagement with said nipple, said means including a cam mounted for rotation about an axis perpendicular to the axis of the conduit, and a manually engageable hand grip for operating said cam and adjustable means for limiting the relative movement between said conduit and said clamp member in one direction.

10. A lubricant discharge nozzle comprising a conduit having a discharge orifice at one end adapted to partially receive the spherical head of a lubricant nipple, a tubular member slidably disposed on said conduit and having a portion overhanging said discharge orifice for engaging with said head of said nipple and means for causing relative longitudinal movement between said conduit and said clamping member, said means including a cylindrical member comprising a valve extending laterally through said conduit, a cam secured to said cylinder and having its cam surface associated with said tubular member including said clamping member, and means for manually rotating said cylinder.

ADIEL Y. DODGE.